May 3, 1938. E. H. HARRIS Re. 20,712

ENAMELING MACHINE

Original Filed March 30, 1936 2 Sheets-Sheet 1

INVENTOR
Edward H. Harris
BY
ATTORNEY

May 3, 1938. E. H. HARRIS Re. 20,712

ENAMELING MACHINE

Original Filed March 30, 1936 2 Sheets-Sheet 2

INVENTOR
Edward H. Harris
BY
Paul A. Johnson
ATTORNEY

Reissued May 3, 1938

Re. 20,712

UNITED STATES PATENT OFFICE 20,712

ENAMELING MACHINE

Edward H. Harris, Bridgeport, Conn., assignor to Wheeler Insulated Wire Company, Bridgeport, Conn., a corporation of Connecticut Original No. 2,087,145, dated July 13, 1937, Serial No. 71,580, March 30, 1936. Application for reissue March 8, 1938, Serial No. 194,547

6 Claims. (Cl. 34—48)

This invention relates to wire enameling.

It is the practice in enameling wire in a machine to pass the wire to the machine from a source of supply, and have the wire pass through the enameling bath or dip in the machine and a drying oven, and again through the dip and oven as many times as desired, and then have the wire pass to a capstan, after which it is wound in a manner suitable for use.

In the process of drying or baking each coating of enamel as the wire passes through the oven, acrid fumes, vapors and gases are given off in substantial quantities, and these are carried off by draft through a hood and pipes to a stack. These gases are of a heavy and obnoxious character, and may form an air-contaminating nuisance in the neighborhood. In addition, the hood attached to the oven for the purpose of removing the gases, of necessity has openings to permit the wire emerging from the oven to pass therethrough, and there is continually a certain amount of leakage of said gases into the enameling room, resulting in discomfiture to the workmen, and requiring additional ventilation to keep the air pure.

An object of the present invention is to obviate the above mentioned difficulties and objections due to the production of these gases and fumes in the enamel-drying process. This is accomplished by burning and otherwise reducing the gases, and in the present way of carrying out the method of the invention, the gases are brought into the combustion chamber of the drying ovens of an enameling machine, thereby utilizing the heat from the combustion of said gases and providing for economy of fuel consumption. By so burning and reducing the gases given off during the enamel-drying process, there has been eliminated this obnoxious by-product of enamel drying, and in its place there is now a smokeless and odorless exhaust.

In the preferred embodiment of an apparatus according to the invention there is provided an enameling machine having a central, vertical heating or firing chamber, on each side of which there is disposed a laterally flattened oven through which the wire passes in an upward direction. The firing chamber has a gas burner near the top which throws flames downward, and so may be called a down-draft heating means for drying ovens. Above the gas burner, the sides of the firing chamber are provided with openings which communicate with the ovens, and at the bottom of the firing chamber there is provided a flue which is connected with a forced draft for sucking the gases from the firing chamber. This forced draft sucks air and the enameling gases into the firing chamber from the tops of the ovens, and this mixture, which is combustible, passes directly by the gas burner and ignites, to further heat the ovens. Because of the forced draft, air is being sucked continually into the tops of the ovens through the openings provided for the wire, and this air mixes with the rising gases from the hot ovens to form a combustible mixture which is sucked into the firing chamber for burning. The strong indraft at the tops of the ovens thus precludes any possibility of escape of the enameling gases. By virtue of the uniform forced draft there also results a better and more even temperature regulation of the oven heat which in consequence makes for a superior enameled wire product.

A feature of the present invention is the resulting economy which is effected by the utilization, in the ovens, of the heat resulting from the burning of the combustible gases which were heretofore passed into the atmosphere with much potential energy still present.

Another feature of the present invention is the compensating heating effect which results when, for any reason, there is an increase in the speed of the wire passing through the machine, and which compensating effect is due to the increased volume of gases attendant to a faster wire speed, which gases are fed into the firing chamber. Thus the result is a hotter oven, which is necessary and desirable to a higher wire speed, and this is realized without a resetting of the thermostatic oven-heat control.

Still another feature of the present invention is the elimination of fire hazard which was heretofore present in the prior enameling art due to condensation of the gases in the hood and pipes used for their removal. Inasmuch as the gases given off in the enameling oven are of a heavy and gummy character, these gases in being led off to the outside atmosphere condense somewhat due to cooling, and a gummy and highly inflammable condensate is formed on the inner walls of the stacking pipes. Should any sparks pass through these pipes for any reason whatever, ignition of this condensate will take place, and a hot stacking or chimney fire will result, and these fires are of frequent occurrence where wire enameling is done. The burning of the oven gases in the firing chamber of the oven, as disclosed by the present invention, produces a smokeless and virtually odorless exhaust which in passing to the atmosphere does not condense on the inner walls of the stacking pipes, and therefore there has been positively removed the danger of fire hazard which was heretofore present.

A further feature of the present invention is the reduction which has been made possible in the overall size of the enameling machine, since the hood and stacking pipes, which were heretofore necessarily disposed on top of the oven between the latter and the upper set of sheaves for the wire, are no longer required. In view of this, the oven can be extended upwardly so as to be closer to the top sheaves, thereby making possible a longer oven, or the sheaves may be placed lower and closer to the top of the oven resulting in a machine of less height.

Another feature of the present invention is the prevention of fouling of the upper sheaves in the machine. According to the present preferred embodiment a down-draft passes by the wires which emerge from the top of the oven, preventing the escape of any of the stacking gases therefrom, and therefore keeping the wire and the upper sheaves clean and free from gum or dirt. As practiced heretofore the stacking hood was interposed between the oven and the upper sheaves, and gases which would invariably escape therefrom were continually depositing foreign matter to cause sticking and fouling of said sheaves, oftentimes resulting in breaking of the wire; this has been obviated entirely by this invention. In addition, the wire and sheaves at the top are no longer subjected to the heat from these gases and therefore are maintained at a cooler and more workable temperature.

A still further feature of the present invention is the simplification of the operations required in initially stringing the machine with wire as well as the operations required in repairing breaks in the wires. Since the machine can now be made with the top sheaves set lower for a given oven length, and since the wires pass directly from the oven to said sheaves without having a stacking hood about them, a machine can be more easily and quickly strung with wire by an operator than has heretofore been possible. It is obvious, also, that the wires passing from the oven to the upper sheaves are now visible to the operator where heretofore they were partially hidden from view by the stacking hood, and therefore the condition of the enamel on the wire may be more readily observed, and also breaks in said wire may be quickly noticed and fixed.

The elimination of the stacking hood with its attendant fault of permitting the gases to escape into the room has also resulted in a cleaner, and more workable shop. In the practice of the present invention no gases are allowed to escape into the room because of the positive indraft at the points where the wire emerges from the oven, and it is no longer necessary to provide additional ventilation facilities in the shop to carry off these gases.

Other features and advantages will hereinafter appear.

Figure 1:
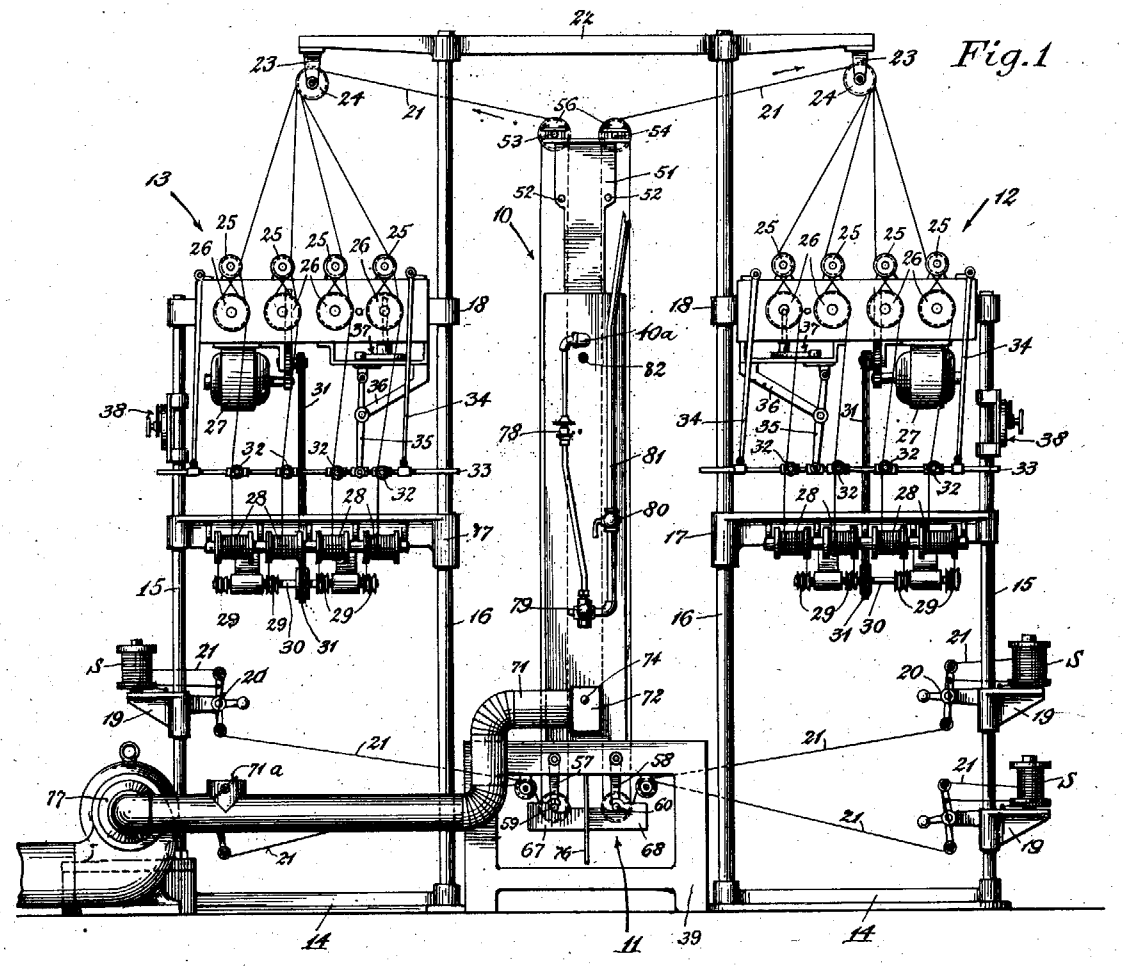
Figure 1 is a side elevation of an enameling machine illustrating one embodiment of the present invention.

The preferred form of enameling machine embodying the present invention includes improved and novel drying ovens broadly designated by the numeral 10, see Fig. 1, and hereinafter explained in detail, enameling dips designated by the numeral 11, and wire handling mechanisms designated by numerals 12 and 13 for handling the supply wires to the dips 11 and oven 10, and for taking-off wires therefrom and spooling said wires.

The wire-handling mechanisms 12 and 13 are similar in all respects, and are supported on frames having base plates 14 which support vertical tubular posts 15 and 16 bridged by spool supporting members 17 and capstan-supporting structures 18. Carried by the vertical posts 15 are spool brackets 19 for supporting the spools S of wire to be enameled, and the brackets 19 carry three-armed levers 20 which provide binding means for said spools, in order to maintain a constant tension on the wire being unwound therefrom. The wires 21 are taken from the supply spools S over pulleys carried by the three-armed levers, and led to the enameling dips to be coated.

The vertical posts 16 extend above the capstan-supporting structures 18, and are bridged at their tops by horizontal struts 22, the ends of which extend horizontally beyond the posts 16, and carry brackets 23 for supporting take-off sheaves 24, over which the wires 21 are brought after leaving the ovens 10. The capstan-supporting structures 18 carry capstans 25 and 26, the capstans 26 being geared together and driven by electric motors 27. Take-off spools 28 are rotatably mounted on the spool-supporting members 17 and are driven from pulleys 29 carried by shafts 30 journaled in brackets carried by the members 17, and said shafts are in turn driven by means of chains 31 from the motors 27. Traversing pulleys 32 for the spools 28 are carried by longitudinally movable rods 33 which are supported by links 34 pivotally mounted on the capstan-supporting structures 18. The rods 33 are caused to reciprocate by means of levers 35 pivotally mounted on brackets 36 and actuated by cam-mechanisms 37 geared to the motors 27. The speed of the motors 27 is controlled by rheostats 38 carried by the vertical posts 15. The wires 21 coming from the oven 10 pass over the sheaves 24 and over the capstans 25 and 26, thence going to the traversing pulleys 32 and the take-off spools 28.

The present preferred embodiment of the improved enameling ovens 10 of the present invention is shown in Figs. 1 to 4 inclusive. A supporting frame 39, preferably of cast metal, is provided to which are secured in vertical position the improved ovens 10, and which frame also carries the enamel dips 11. The ovens 10 have a central firing chamber 40 which is relatively flat, wide and high, and which is confined by two heavy metallic side plates 41. The plates 41 are supported in spaced parallel relation within a chamber of the same width and height as the firing chamber, but of broader dimension, and formed by two similar channel-shaped castings 42 having longitudinally extending flanges 43 abutting each other, and through which pass bolts for securing the castings together. Preferably, the side edges of the plates 41 are held in longitudinal grooves 44 in the walls of said castings, so as to provide two similar, flat, drying or oven-chambers 45 between said plates and the castings. The plates 41 and castings 42 are supported vertically on a bottom plate 46 which in turn is bolted to the frame 39. The top of the firing chamber 40 is closed over by a channel-shaped member 47, which is packed with heat-resistant and insulating material 48.

An outer metal casing 49 is provided to fit about the castings 42, but spaced therefrom, and the spaces between the casing and the castings are packed with heat insulating material 50 to prevent loss of heat from the oven chambers and firing chamber.

A gas burner 40a is disposed horizontally within the firing chamber 40 near its top, said burner having downwardly directed jets from which the gas emerges and burns so as to heat the oven chambers 45 on each side of the firing chambers. According to the present embodiment, there are thus provided two separate oven chambers through which wires may pass, the oven chambers being disposed one on each side of the firing chamber 40 to receive heat therefrom. Wires may be brought to the ovens 10 from each of the wire handling mechanisms 12 and 13, the wires handled by the mechanism 12 passing through the oven chamber adjacent said mechanism, and the wires handled by the mechanism 13 passing through the oven chamber adjacent this latter mechanism.

Attached to the upper portions of the castings 42 are extension plates 51 braced by tie rods 52 and supporting at their upper extremities shafts 53 and 54 which each carry a plurality of sheaves 55 and 56 over which the wire emerging from the oven chambers pass. Below the oven chambers and attached to the supporting frame 39 are downwardly extending links 57 and 58 which support at their lower extremities shafts 59 and 60 respectively, each carrying a plurality of sheaves 61 and 62 over which the wires entering the oven chambers pass.

The bottom plate 46 is provided with slots 46a so disposed as to be in registration with the bottoms of the oven chambers 45, to permit wire to pass from below the plate 46 through the slots therein and into the oven chambers 45, and said oven chambers are open at their tops so that wire passing therethrough may emerge without obstruction.

The upper sheaves 55 and 56 are respectively so aligned relatively to the lower sheaves 61 and 62 and the oven chambers 45 that wire may pass from the lower sheaves to the upper sheaves through said oven chambers without coming in contact with the walls thereof, and may freely pass from the upper sheaves to the lower sheaves on the outside of the casing 49.

The frame 39 has brackets which support shafts 63 and 64 carrying pulleys 65 and 66 over which the wires, in entering the machine, pass before reaching the lower sheaves 61 and 62.

The shafts 59 and 60 which carry the lower sheaves also support enameling dip pans 67 and 68, which hold the enameling solution for coating the wire, and these pans are closely positioned to the sheaves 61 and 62 so that the lower portions of said sheaves are continually immersed in the enameling dip. A wire 21 which is to be coated with enamel first passes over a pulley 65, and then through the enameling dip under a sheave 61, where it is coated, after which it passes through one of the slots 46a in the bottom plate 46, and up through one of the drying ovens 45 and over an upper sheave 55.

Figure 2:
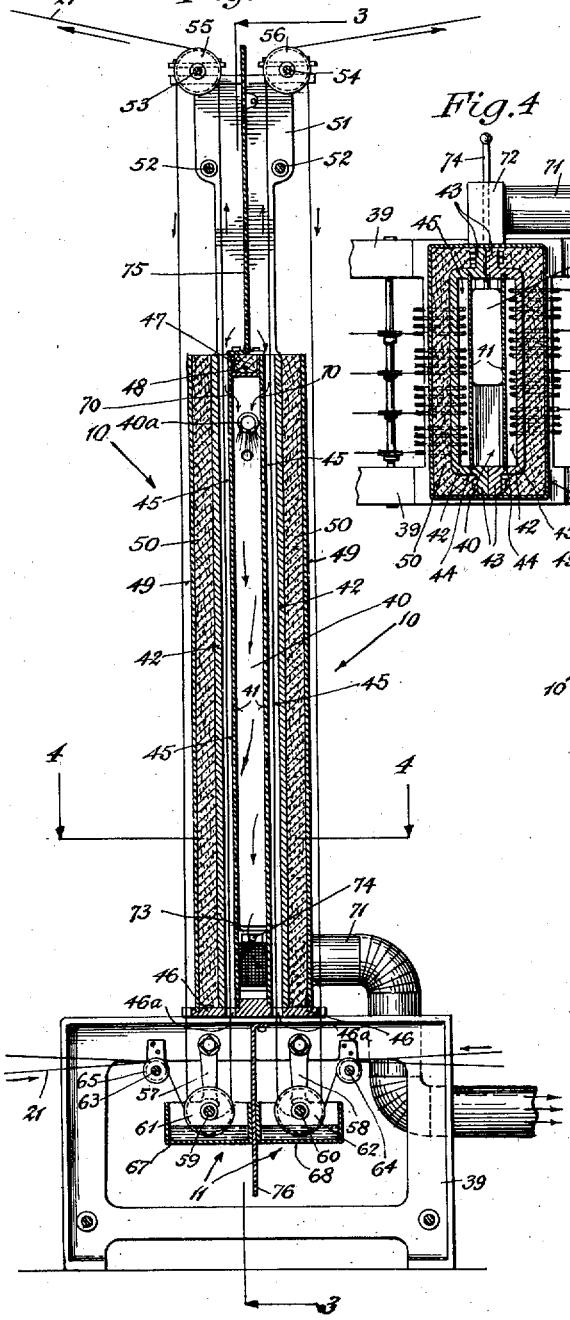
Fig. 2 is a vertical transverse section of the improved drying oven of the enameling machine.
Figure 4:
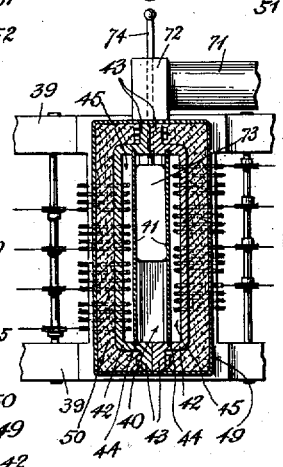
Fig. 4 is a horizontal section of the oven taken on the line 4—4 of Fig. 2.
Figure 3:
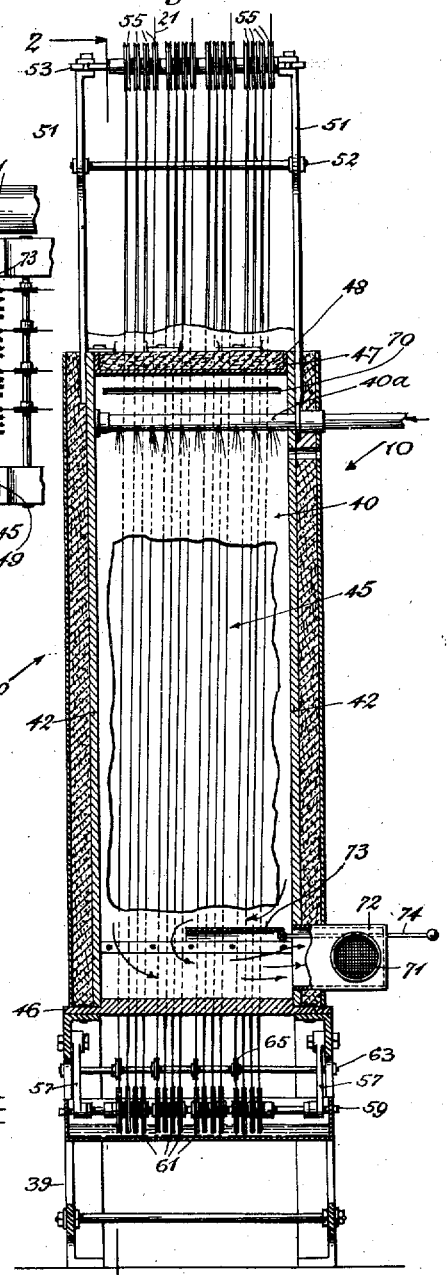
Fig. 3 is a vertical longitudinal section of the enameling oven taken on the line 3—3 of Fig. 2 the sectional view of Fig. 2 being taken on the line 2—2 of Fig. 3.

It will be noted that the wire may pass over the sheaves and through the enameling dip and drying oven chamber a number of times to give the wire a number of coatings of enamel; in the specific illustrated form of Figs. 2, 3 and 4, each wire is shown as receiving four coatings of enamel, and accordingly after the wire has emerged from the oven chamber for the first time it passes over a top sheave 55 and down outside of the casing 49 around a second bottom sheave 61, is again coated and again passed up through the oven chamber for drying, and this repeated until four coats have been applied. Each coat of enamel on the wire is dried by the oven before the next coat is applied, and after the drying of the fourth coat the wire is brought to the spooling mechanism from the last upper sheave 55 over which it passes.

Figs. 3 and 4 show four groupings of wires for each oven, each grouping representing one individual wire receiving four coatings of enamel; thus eight wires are being given each four coatings of enamel.

It will thus be seen that each time a wire is given a coating of enamel, it passes directly upward into the drying oven chamber. The enamel, in drying on the wires in the oven chambers, gives off heavy and acrid vapors which are particularly obnoxious, and which were heretofore carried off from the tops of the oven by means of a stacking hood, and emitted into the atmosphere.

By the present invention these acrid and objectionable vapors are burned and otherwise reduced so as to be transformed into a smokeless and virtually odorless exhaust which is not harmful to plant and animal life, nor undesirable in other respects.

In the accomplishment of this, according to the preferred embodiment shown in Figs. 2, 3 and 4, each of the walls 41 of the firing chamber 40 is provided with a long horizontal slot 70 near its top and disposed above the gas burner 40a, and the slots 70 thus provide communicating passages between the oven chambers 45 and the firing chamber 40. There is also provided at the bottom of the firing chamber an opening connected with a forced draft exhaust pipe 71 by means of an elbow fixture 72. By the provision of the communicating passages formed by the slots 70, and by the provision of forced exhaust draft in the bottom of the firing chamber, gases and vapors which are given off in the oven chamber 45 will be sucked into the firing chamber, and will pass directly by the gas burner 40a. In so doing, these gases will be ignited, and will burn within the firing chamber so as to further heat the drying oven chambers. In addition, the draft provided in the firing chamber 40 will also cause air to be sucked into the tops of the oven chambers at the places where wires emerge therefrom, and will also cause air to be sucked into the bottoms of said chambers at the places where wires enter.

Thus, air will be mixed with the vapors given off by the enamel in the ovens, and this mixture will be transferred to the firing chamber and caused to pass the gas burner 40a, which will ignite said mixture. I have found that the combustion of the gases given off by the enamel in drying is extremely complete and thorough, and that these gases are reduced to a colorless and virtually odorless exhaust which is not objectionable in character.

In addition, the burning of the vapors given off by the enamel in the firing chamber 40 results in a further heating of the oven chambers, and as a consequence less gas is required by the burner 40a to maintain a given oven temperature than was heretofore the case. This feature of burning the enameling gases in the firing chamber has resulted in a striking economy of fuel consumption, and has also resulted in a more uniform wire product, as will be hereinafter disclosed.

According to the preferred embodiment of the invention shown in Figs. 2, 3 and 4, the oven chambers 45 do not have a uniform temperature throughout, but are hotter at their top portions than at their bottom portions, and this is due to the burner 40a being located near the tops of said chambers. This arrangement has been found exceedingly satisfactory in so far as uniformity of wire product is concerned, since the wire which is freshly enameled is not subjected immediately to the hottest portions of the oven chambers, but is brought into said chambers at their lowermost or cooler portions. By thus subjecting the freshly enameled wire to a relatively low temperature first and then causing gradually subjection to higher temperatures, the coating of enamel applied to the wire will adhere more tenaciously and will form a more dense and superior insulating film than would be the case otherwise.

It is to be particularly noted that the mixture of vapor and air entering the firing chamber is drawn into said chamber from the hottest portions of the oven chambers, and therefore this mixture is at a high and readily combustible temperature, and burns without smoke and without deposit of soot.

Due to the heated condition of the oven chambers, the vapors given off therein are rising continually toward the slots 70 which open into the firing chamber, and in so rising they cause air to be drawn into the lower portions of the oven chambers, thus effectively preventing any escape of gases from said lower portions. In addition, as a result of the draft in the firing chamber, air will be continually sucked into the oven chambers through the tops thereof, and will also effectively prevent escape of vapors therefrom where the wires emerge. Thus, there is no possibility of the vapors in the oven chambers escaping into the room, and particularly no possibility of these vapors reaching the upper sheaves 55 and 56 over which the wire passes, and causing fouling thereof due to deposit of gum and other foreign matter.

It is to be noted that there is a compensation effected by burning the vapors given off in the oven chambers 45 in the firing chamber 40 to further heat the oven chambers. It is well known that more heat is required for drying the enamel on wire when the speed of the wire passing through the oven chambers is increased. By the present invention, any increase in the speed of the wire passing through the oven chambers will result in more enamel surface being dried, which in turn will cause more vapors to be given off in said chambers. Therefore, the vapors which are sucked into a firing chamber 40, for a faster wire-speed, will be more dense and will supply more heat in burning. Thus there will be effected thereby a higher temperature of the oven chambers, which higher temperature is desirable and necessary for a faster wire-speed. This compensating effect also obtains for slower wire speeds to reduce the heating of the oven chambers, and therefore obviates resetting of the thermostatic control valve in the gas supply line for the firing chamber, and as a result variations in the speed of the wire require no attention from the operator in readjusting the thermostatic valve.

For the purpose of causing a more uniform distribution of the draft in the firing chamber 40 there is provided in the lower portion thereof a baffle plate 73 slidably mounted therein. The baffle 73 is moved by means of a rod 74 extending through the elbow fixture 72 so that adjustment can be readily made from the outside.

A vertical flat metal backing plate 75 is attached to the extension plates 51 and to the top piece 47 of the firing chamber so as to be disposed between the wires emerging from the oven chambers 45, for the purpose of preventing entanglement of the wires of any one oven with a wire which might break in the other oven, and said backing plate preferably has surfaces of light color, so that the wire coming from the ovens will be sharply outlined thereagainst to reveal abnormalities in the coating of enamel, or breaks in the wire. Also, attached to the supporting frame 38 is a partition plate 76 disposed between the enameling pans 67 and 68 to provide for the horizontal positioning of said pans on the shafts 59 and 60 and to prevent entanglement of the wires passing through the oven chamber on one side of the firing chamber with the wires passing through the other oven chamber should any breaks occur.

Referring to Fig. 1, the forced draft exhaust pipe 71 is connected to the intake side of a blower 77, the exhaust side of which is carried outside of the building. For the purpose of regulating the draft applied to the firing chamber and the ovens, there is provided in the pipe 71 a damper 71a which may be adjusted for a given set of conditions.

The gas burner 40a is connected with a mixing valve 78 and a thermostatic control valve 79 through a shut off valve 80 to a gas supply pipe 81.

By the provision of the draft means connected with the firing chamber 40, there has been eliminated the stacking hood which was, prior to the present invention, disposed directly over the tops of the ovens, between said tops and the upper sheaves. As a result it is now possible to arrange the upper sheaves so that they are much closer to the tops of the ovens without danger that the vapors of said ovens foul said sheaves, and therefore the overall height of the ovens and firing chamber has been materially reduced. In addition, the elimination of the stacking hood has simplified greatly the operations required in initially stringing the machine with wire, and also simplified the locating and mending of breaks in said wire. The wires passing from the oven to the upper sheaves are now clearly visible where before they were partially hidden by the stacking hood, and therefore the condition of the enamel on the wires may be more readily observed, and any abnormalities quickly remedied.

For the purpose of lighting the burner 40a, and for observing the degree of combustion in the firing chamber 40, there is provided an aperture 82 disposed directly under the burner 40a in the walls of said chamber and the outer casing 49.

It should be understood that the embodiment of the present invention shown in Figs. 1 to 4 inclusive is merely for illustrative purposes, and the inventive concept thus illustrated is not to be limited thereby but is to be taken more properly in connection with the various objects and features described, and in connection with the appended claims.

Variations and modifications may be made within the scope of this invention and portions of the improvements may be used without others.

I claim:

1. In a wire-enameling machine, a vertical substantially flat, deep, and wide oven chamber having oppositely disposed openings in its top and bottom to permit a plurality of freshly enameled wires to be passed through the oven for drying, said chamber having a flat wall disposed broadside to said wires in close proximity therewith, said wall having a long and narrow horizontal aperture therein; a substantially flat firing chamber having for one wall the said flat wall of the oven so that the aperture thereof forms a passage between the oven and firing chamber; means connected with the firing chamber for causing an indraft in said chamber, said means including a flue which opens into the chamber; and means for producing a substantially continuous elongate flame in the firing chamber closely adjacent the aperture in the wall thereof and between said aperture and the flue opening so that gases sucked through the aperture into the firing chamber from the oven will pass by said flame and be ignited thereby.

2. In a wire-enameling machine, a vertical substantially flat, deep, and wide oven chamber having oppositely disposed openings in its top and bottom to permit a plurality of freshly enameled wires to be passed through the oven for drying, said chamber having a flat wall disposed broadside to said wires in close proximity therewith, said wall having a long and narrow horizontal aperture therein; a substantially flat firing chamber having for one wall the said flat wall of the oven so that the aperture thereof forms a passage between the oven and firing chamber; means connected with the firing chamber for causing an indraft in said chamber, said means including a flue which opens into the chamber; and an elongate burner having a plurality of aligned openings so as to produce substantially a continuous flame, said burner being located in the firing chamber closely adjacent the aperture in the wall thereof and between said aperture and flue opening so that gases sucked through the aperture into the firing chamber from the oven will pass by said burner and be ignited by the flame thereof.

3. In a wire-enameling machine, an oven chamber having oppositely disposed openings in its opposite ends to permit a plurality of freshly enameled wires to be passed through the oven for drying, said chamber having a flat wall disposed broadside to said wires in close proximity therewith, said wall having a long and narrow aperture therein; a substantially flat firing chamber having for one wall the said flat wall of the oven so that the aperture thereof forms a passage between the oven and firing chamber; means connected with the firing chamber for causing an indraft therein, said means including a flue which opens into the firing chamber; and means for producing a substantially continuous elongate flame in said firing chamber closely adjacent the aperture in the wall thereof and between said aperture and the flue opening so that gases sucked through the aperture into the firing chamber from the oven will pass by said flame and be ignited thereby.

4. In a wire-enameling machine, an oven chamber having oppositely disposed openings in its opposite ends to permit a plurality of freshly enameled wires to be passed through the oven for drying, said chamber having a flat wall disposed broadside to said wires in close proximity therewith, said wall having a long and narrow aperture therein; a substantially flat firing chamber having for one wall the said flat wall of the oven so that the aperture thereof forms a passage between the oven and firing chamber; means connected with the firing chamber for causing an indraft therein, said means including a flue which opens into the firing chamber; and an elongate burner having a plurality of aligned openings so as to produce substantially a continuous flame, said burner being located in the firing chamber closely adjacent the aperture in the wall thereof and between said aperture and flue opening so that gases sucked through the aperture into the firing chamber from the oven will pass by said burner and be ignited by the flame thereof.

5. In a wire-enameling machine, an oven chamber having openings in the opposite ends thereof to permit freshly enameled wires to be passed through the oven for drying; a wall of the oven chamber having an elongate aperture; a firing chamber including as one wall thereof the wall of the oven chamber having the aperture therein so that the aperture thereof forms a passage between the oven and firing chamber; means connected with the firing chamber for causing an indraft therein, said means including a flue which opens into the firing chamber; and means for producing a substantially continuous elongate flame in said firing chamber closely adjacent the aperture in the wall thereof and between said aperture and the flue opening so that gases sucked through the aperture into the firing chamber from the oven will pass by said flame and be ignited thereby.

6. In a wire-enameling machine, an oven chamber having openings in the opposite ends thereof to permit freshly enameled wires to be passed through the oven for drying; a wall of the oven chamber having an elongate aperture; a firing chamber including as one wall thereof the wall of the oven chamber having the aperture therein so that the aperture thereof forms a passage between the oven and firing chamber; means connected with the firing chamber for causing an indraft therein, said means including a flue which opens into the firing chamber; and an elongate burner having a plurality of aligned openings so as to produce substantially a continuous flame, said burner being located in the firing chamber closely adjacent the aperture in the wall thereof and between said aperture and flue opening so that gases sucked through the aperture into the firing chamber from the oven will pass by said burner and be ignited by the flame thereof.

EDWARD H. HARRIS.